March 27, 1928.
J. LEDWINKA
REMOVABLE CUSHION FOR VEHICLES
Filed May 8, 1919
1,664,121
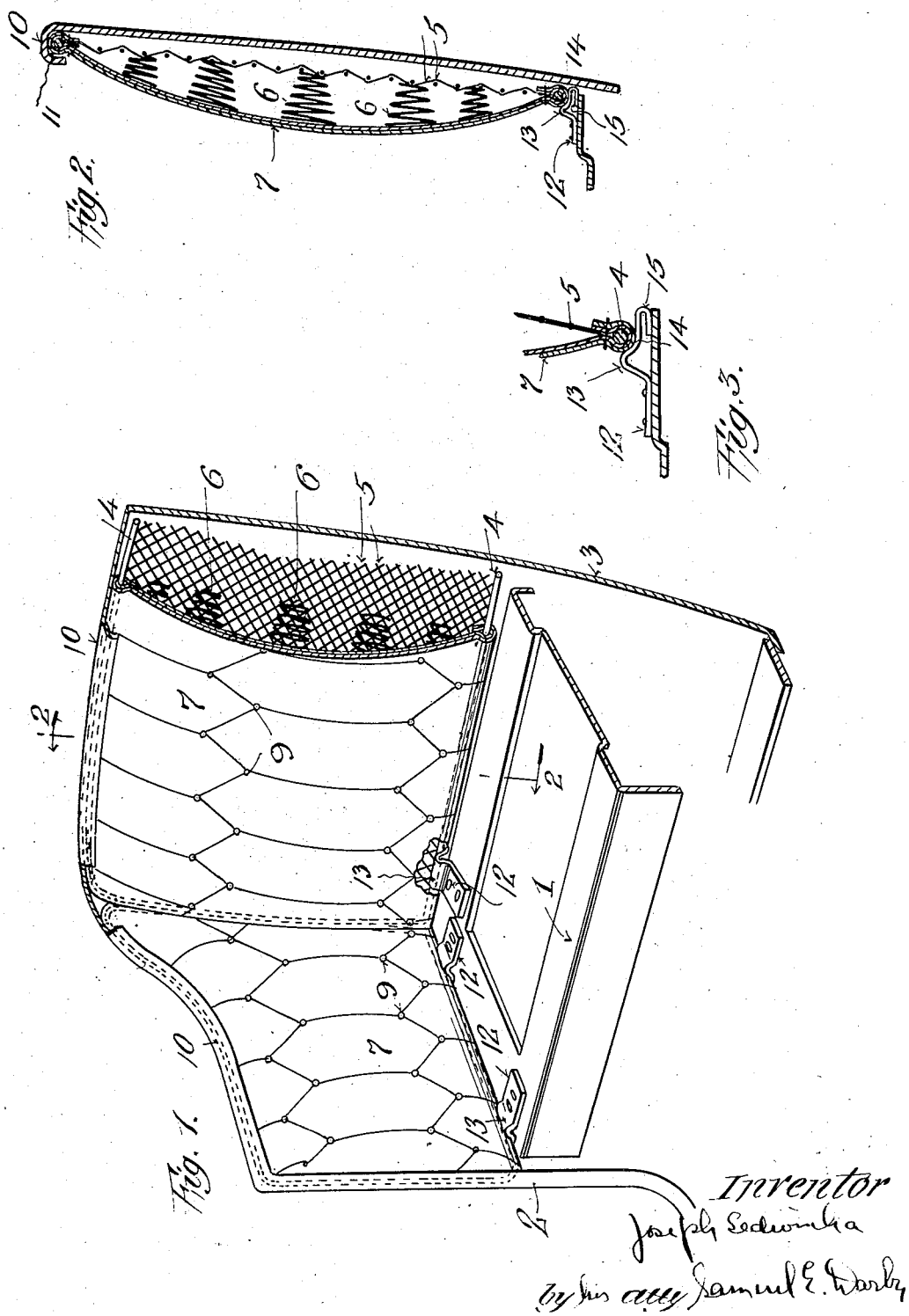

Patented Mar. 27, 1928.

1,664,121

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

REMOVABLE CUSHION FOR VEHICLES.

Application filed May 8, 1919. Serial No. 295,531.

This invention relates to removable cushions for vehicles and other purposes.

The object of the invention is to provide cushion or upholstery structures for vehicles and other purposes which are simple and inexpensive to manufacture, and efficient in use.

A further object is to provide flexible all metal cushion frames with upholstery applied thereto which may be constructed as units and independently of the vehicle body.

A further object is to provide means for applying said flexible frames and upholstery structures to the vehicle body so that they are maintained securely and efficiently in place and yet are easily and quickly detachable or removable from the vehicle body.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the drawings,—

Fig. 1 is a view in perspective, with parts broken away, of a vehicle seat with side and back portions, showing the removable cushions in position.

Fig. 2 is a vertical section of Figure 1, on the line 2, 2, looking in the direction of the arrows, showing the cushion frame and the upholstery applied thereto, and applied to a vehicle body in accordance with my invention.

Fig. 3 is a detail broken view in vertical section showing the manner of detachably securing the lower edge of the removable cushion to the vehicle body in accordance with my invention.

The same part is designated by the same reference sign wherever it occurs throughout the several views.

In the drawings Fig. 1 shows a form of seat in common use for automobiles, the seat bottom 1, the sides 2, and the back 3 being shown in this instance as formed of sheet metal.

In carrying out my invention I construct the cushion for the seat in separate sections. In the particular arrangement shown I employ three sections, namely a seat back section and a section at each side thereof; these several sections being shaped to conform, respectively, to the contour or curvature of the seat back and side panels of the tonneau body, but somewhat larger in width from the top to the bottom.

Frames for these sections are formed by bending a metal rod 4 so as to form a border and to conform with the shape desired for each section. Attached to each frame so formed, in any suitable manner is a stiff but flexible metallic netting or mesh 5 to which cushion-springs 6 are secured. Upholstery or trim 7 is applied and secured to each frame over said springs. This upholstery may be secured to the frames in any suitable manner such as first employing a backing of canvas or other suitable material and securing the same to the frames stretching it over the cushion springs and then employing an outer material such as leather or the like which is also secured to the frames in the same manner as the canvas such as stitching the same around the rod 4. The space between the leather and the canvas may be packed, if desired, with some filler material and the canvas and leather may be fastened together at desirable points intermediate their ends as indicated at 9 to secure a tufted appearance to the upholstery.

By the structures above described it can be seen that I provide flexible all metal cushion frames with upholstery applied thereto, which may be constructed as separate units and independently of the vehicle body.

In applying the cushion frame and upholstery structures to the vehicle body it is proposed to have the upper edge 10 of the vehicle body 3, shaped to form an inturned inverted channel portion as shown in Fig. 2 at 11. This channel portion is adapted to receive the upper edge of the cushion frames. On the seat portion 1 of the vehicle body there are secured at suitable intervals flexible metal stampings 12 having upstanding bent portions 13 and seats 14 formed therein adapted to receive and retain the lower edge of the cushion frame and upholstery structures, the ends of the stampings 12 being bent or folded back upon themselves and resting upon the seat panel, thereby securing a desirable spring or resiliency in the stamping.

In order to apply the cushion frames to the vehicle body the upper bars of the cushion frames are seated within the inverted channel of the vehicle body. It is desirable to maintain the cushion frame units removably seated at their upper edges in the said channels, and under vertical tension, in order that the sightly shape and contour of said units may be maintained and sagging or collapsing thereof prevented. This result may be attained in various ways. One simple and illustrative arrangement is shown wherein, the lower edges or bars of said cushion frames are forced over the bends 13 of the flexible metallic stampings 12 until they become seated in the depressions 14 therein, the resiliency or spring of the stampings as well as of the cushion frames facilitating this operation and also serving to efficiently retain and hold the cushion sections in place under vertical tension.

By this arrangement the cushion frames are held securely in place and in order to detach and remove the cushions the operation above described is simply reversed, that is, the lower edges of the cushions are sprung out of their seats and the upper edges are then unseated or withdrawn from the channel portion 11 of the vehicle body.

It will be understood that when the seat cushions are applied to the seat panel 1, after the side and back cushion sections have been applied, the retaining spring clips or stampings 12 if used will be effectually concealed.

It will be observed that the upholstery frame or unit constructed in the manner above described is essentially and inherently flexible due to the use of the border member 4, and the flexible metallic mesh 5, which forms the cushion back and supports the springs 6. As a result, when the upper edge of the cushion frame is seated in the channel 11, and the lower edge thereof is forced home, in applying the cushion section to the seat back, or side, the cushion frame will yield somewhat vertically in the direction of its width to permit the lower edge of the frame to be properly seated. When the lower edge of the frame is seated, it is held and maintained under stress which imposes a vertical compression therein, due both to its own inherent resiliency as well as to the flexibility of the stampings 12 if used. It is this vertical stress I refer to as a vertical tension.

While I have shown and described my invention as applied to an automobile body I do not wish to be restricted or limited to such use as the principles thereof are equally well applicable to the construction of the upholstery for other structures wherein removable cushion sections may be applied.

Having now set forth the objects and nature of my invention and a structure embodying the principles thereof, what I claim as new and useful, and of my own invention, and desire to secure by Letters Patent, is,—

1. The combination with a vehicle body having a seat back and side portions formed with a longitudinally extending channel seat at its upper edge, of flexible metallic cushion frame sections for said back and side portions respectively, each section including a rod bent to conform to the contour of its respective seat back or side portion, and having its upper edge removably seated in said channel seat, flexible metallic netting secured to said rod, an upholstery cushion secured to said rod and stretched over said metallic netting, springs interposed between said flexible metallic netting and said upholstery cushion and flexible metallic stampings secured to the seat of said vehicle to yieldingly maintain the lower edge of said cushion frame seated in its position with respect to said seat back or side portion.

2. The combination with a vehicle body having a seat back and side portions formed with a longitudinal channel at its upper edge, of cushion section frames each including a rod bent to conform to the contour and area of the seat back or side portions respectively, cushion devices connected to each frame rod, the upper edges of said frames adapted to be removably received in said channel, and metallic stampings having a bent portion over which the lower edges of said frames are adapted to be sprung to form retaining means for said frames.

3. The combination with a vehicle body having a seat back and side portions formed with a longitudinal channel at its upper edge, of cushion frames for said seat back and side portions, respectively, each cushion frame including a rod bent to conform to the contour and area of the seat back or side portion to which it is to be applied, cushion devices connected between the upper and lower horizontal portions of said rod, metallic stampings secured to the vehicle seat, each having a bent portion formed therein, and the end thereof bent back and resting on the seat panel, the cushion frame adapted to be sprung over said stamping bends whereby it is yieldingly held and detachably retained in place.

4. The combination with a vehicle body having a seat back and side portions, of a plurality of flexible, metallic cushion frame sections for said seat back and side portions, each section including a border rod bent to conform to the curvature of the corresponding seat back or side portion of the body, a flexible member secured at its edges to said border rod, an upholstery cushion secured to said rod and stretched over said flexible member, and means for detachably and removably securing each frame section under vertical stress to the corresponding seat back or side portion of the vehicle body.

5. The combination with a vehicle body having a seat back and side portions, of a plurality of flexible, metallic cushion frame sections for said seat back and side portions, each section including a border rod bent to confrom to the curvature of the corresponding seat back or side portion of the body, a flexible member secured at its edges to said border rod, an upholstery cushion also secured to said rod, a plurality of springs interposed between said flexible member and said cushion, and metallic stampings secured to the vehicle body and engaging the lower edges of said frame sections to yieldingly maintain said sections seated under vertical stress with respect to said seat back and side portions.

6. The combination with a vehicle body having a seat back and side portions and a single, continuous channel seat at the upper edge of and curved to conform to said seat back and side portions, of a plurality of flexible, metallic cushion frames bent to conform to the curvature of the corresponding seat back or side portion, and forming independent, detachable cushion frame units, each unit having its upper edge removably seated in said channel seat, and maintained seated therein under yielding vertical stress.

7. The combination with a vehicle body having a seat back and side portions and a single, continuous, channel seat at the upper edge of and curved to conform to said seat back and side portions, of independent, detachable upholstery units for said seat back and side portions, respectively, and means to maintain each of said units under yielding vertical stress with its upper edge removably seated in said channel seat.

8. The combination with a vehicle body having a seat back and side portions and a single, continuous, channel seat at the upper edge of and curved to conform to said seat back and side portions, of a plurality of independent upholstery units for said seat back and side portions, respectively, the upper edge of each unit being removably seated and maintained under yielding vertical stress in said continuous channel seat.

9. A detachable and removable upholstery unit for vehicle bodies comprising a border rod, bent to conform to the contour of an automobile seat back and side portions, a flexible member secured at its marginal edges to said border rod, upholstery also secured at its marginal edges to said border rod and overlying the flexible member, and a plurality of springs interposed between said upholstery and flexible member.

10. The combination with a vehicle body having a seat back provided with a longitudinally-extending channel seat at its upper edge, of a detachable upholstery unit inherently compressible vertically and having its upper edge removably seated in said channel seat, and means engaging the lower edge of said unit and yieldingly maintaining it seated and compressed between said channel seat and said means.

11. The combination with a vehicle body having a seat back, of a cushion unit inherently compressible vertically and means acting to compress said unit and to detachably secure the same under vertical compression, to said seat back.

12. The combination with a vehicle body having a seat back and side portions and a single continuous seating at the upper edge of said seat back and side portions, of a plurality of separate detachable upholstery units, each having an upper frame member engaging said seating, and resilient means for maintaining said units in position.

13. The combination with a vehicle body having a seat support, a seat back and side portions and a seating at the upper edge of said seat back and side portions, of separate back and side upholstery units removably mounted on said seat support and each having an upper frame member and a resilient means to yieldingly hold said unit against said seating and under vertical compression.

14. The combination with a vehicle body having a seat back and side portions, of a plurality of separate detachable upholstery units, each including a frame, the upper members of said frames respectively engaging freely the upper edges of the body seat back and side portions, and resilient means to maintain said units under vertical compression with said upper frame member in said engagement.

15. The combination with a vehicle body having a seat back and side portions formed with a seat at the upper edges thereof, of a plurality of independent removable cushion units for said seat back and side portions, respectively, the upper edges of said units freely engaging in said seat and resilient means for maintaining said units under vertical compression therein without securement thereto.

16. The combination with a vehicle body having a seat back and side portions formed with a channel at the upper edges thereof, of a plurality of independent removable cushion units for said seat back and side portions, respectively, the upper edges of said units freely engaging in said channel and resilient means for maintaining said units in said engagement under vertical compression.

17. In vehicle body construction, in combination, a body member shaped to provide a seat portion having a depending flange along its upper edge, and upholstery units therefor comprising separate frame members each fitting a specific portion of the body member, one edge of each frame being adapted to engage behind the flange of the body, the upholstered end frames of the seat being engaged by the ends of the back frame for the seat, and means engaging the lower edges of the upholstered frames to hold the said frames in position.

18. In a vehicle body construction, in combination, a body member shaped to provide a seat, the upper edge of said seat portion having an inturned depending flange spaced from the main portion, and upholstery therefor comprising separate units shaped to conform to the shape of the ends and back respectively of the said seat portion, the back unit being adapted to engage the rear ends of the end units, each of the said units being adapted to extend behind said depending flange of the body, and means engaging the lower edges of the said units when in operative position.

19. In a vehicle body construction, in combination a body member shaped to provide a seat, said body member having an inturned flange at its upper edge, upholstery units therefor comprising separate frame members, each fitting a specific portion of the body member, co-acting means on said flange and units for locking the same together, said means being adapted to be disconnected by movement of the lower edges of the said units outward and downward, the upholstered end frames of the seat being engaged by the ends of the back frame for the seat, and means engaging the lower edges of the upholstered frames to hold the said frames in position.

20. In a vehicle body construction, a panel comprising a transverse portion having angularly disposed end portions, the extremities of which are turned inwardly together with the upper edge of the panel, upholstery units for the end portions of said panel having their forward edges disposed behind said inturned extremities and their upper edges disposed beneath the upper inturned edge of the panel and an intermediate upholstery unit disposed upon the transverse portion of the panel with its upper edge beneath the inturned edge portion thereof.

21. The combination with a vehicle body member having opposed abutments, of an upholstery unit having a flexible frame, the opposite edges of said frame respectively engageable against said opposed abutments under tension of said frame.

22. The combination with a vehicle body member having opposed abutments of an upholstery unit having a flexible frame, the opposite edges thereof respectively adapted for interlocking engagement with said abutments under flexure of said frame.

23. The combination with a vehicle body member having opposed abutments, of an upholstery unit having a flexible frame, the opposite edges thereof respectively engageable with said abutments under flexure of said frame, one of said abutments having an extended surface for engagement with the corresponding edge of said unit to flex said frame as the unit is swung upon its other edge into position for use, the said last mentioned edge being engageable with the other abutment.

24. The combination with a vehicle body member having upper and lower abutments, of an upholstery unit having a flexible frame engageable between said abutments through flexure of said frame, the lower of said abutments forming a seat cushion support.

25. The combination with a vehicle body having a seat panel and a seat cushion support, said panel having an abutment at its upper edge, of a flexible detachable upholstery unit the upper and lower edges of said unit being engageable under flexure respectively against said abutment and seat cushion support.

26. The combination with a vehicle body having a seat panel and a seat cushion support, said panel having an abutment disposed in opposing relation to the seat cushion support, of a flexible upholstery unit of somewhat greater width than the distance between said abutment and cushion seat support, and engageable under flexure between said abutment and cushion support.

27. The combination with a vehicle body having opposing abutments, of a flexible upholstery unit of greater width than the distance between said abutments, and detachably engageable at its opposite edges with said abutments when in position for use.

28. The combination with a vehicle body having opposing abutments, of an upholstery unit provided with complemental coacting means a greater distance apart than the normal distance between said abutments, and detachably engageable at said abutments when the unit is in position for use, certain of which aforesaid elements are inherently resilient in compression whereby they are fore-shortened to admit the upholstery to be thrust into position and held in place between the abutments.

In testimony whereof I have hereunto set my hand on this 30th day of April, A. D. 1919.

JOSEPH LEDWINKA.